(12) United States Patent
Singh et al.

(10) Patent No.: US 10,002,098 B2
(45) Date of Patent: Jun. 19, 2018

(54) METHODS AND SYSTEMS FOR SHARING INFORMATION BETWEEN PROCESSORS

(71) Applicant: NETAPP, INC., Sunnyvale, CA (US)

(72) Inventors: Amit Kumar Singh, Wexford, PA (US); Michael M. Loebig, Cranberry Township, PA (US)

(73) Assignee: NetApp, Inc., Sunnyvale, CA (US)

( * ) Notice: Subject to any disclaimer, the term of this patent is extended or adjusted under 35 U.S.C. 154(b) by 682 days.

(21) Appl. No.: 14/510,859

(22) Filed: Oct. 9, 2014

(65) Prior Publication Data

US 2016/0103779 A1    Apr. 14, 2016

(51) Int. Cl.
  *G06F 13/40*    (2006.01)
  *G06F 13/42*    (2006.01)

(52) U.S. Cl.
  CPC ...... *G06F 13/4031* (2013.01); *G06F 13/4282* (2013.01)

(58) Field of Classification Search
  None
  See application file for complete search history.

(56) References Cited

U.S. PATENT DOCUMENTS

| | | | |
|---|---|---|---|
| 6,286,070 B1 * | 9/2001 | Ohara | G06F 13/18 710/107 |
| 6,449,289 B1 * | 9/2002 | Quicksall | G06F 13/4291 370/475 |
| 6,484,217 B1 | 11/2002 | Fuente et al. | |
| 2004/0237006 A1 | 11/2004 | Adkisson et al. | |
| 2011/0202924 A1 | 8/2011 | Banguero et al. | |

* cited by examiner

*Primary Examiner* — Idriss N Alrobaye
*Assistant Examiner* — Dayton Lewis-Taylor
(74) *Attorney, Agent, or Firm* — LeClairRyan PLLC

(57) ABSTRACT

Methods and systems for sharing access to a computer resource accessible by a bus between two controllers are provided. For example, a machine implemented method of sharing access to computer resources includes requesting access to a bus from a processor of a first controller to access a device shared with a processor of a second controller; waiting for a positive response from the second controller; when the positive response is received, accessing the bus for less than a first timeout period; resetting a timer before the timer reaches the first timeout period to extend access to the bus, when access is not complete and a total access time is less than a second timeout period; and releasing the bus when access is complete or the second timeout period has been reached.

15 Claims, 5 Drawing Sheets

METHODS AND SYSTEMS FOR SHARING INFORMATION BETWEEN PROCESSORS

TECHNICAL FIELD

The present disclosure relates to communications between processors, and more specifically, to sharing access to resources via a bus interface.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems. The storage operating system stores and manages shared data containers in a set of mass storage devices.

Storage system hardware is expected provide fast access to stored data, often for multiple clients at once. As such, storage servers often have multiple components to carry out various tasks. These components can only increase flexibility and performance of a system if they are able to handle or preferably prevent conflicts, lock-ups, or the like among simultaneous actions by different components.

For example, a storage—or any other computer—system may include two or more baseboard management controllers (BMCs), which are specialized service processors that monitor the physical state of a computer, server, or other hardware component. BMCs monitor internal physical variables of a computing system, including, for example, temperature, humidity, power-supply voltage, fan speeds, and the like. A BMC can then report issues to a central processing unit (or an administrator) if parameters stray from particular norms.

BMCs often have to access shared resources, for example, system memory, power supply units, and others to monitor various system parameters. Typically, BMCs do not support a master-slave environment and hence two processors may be able to access the same storage space that stores information regarding monitored parameters. Continuous efforts are being made to improve communication between controllers in general and BMCs in particular.

SUMMARY

In one aspect, a machine implemented method of sharing access to computer resources is provided. The method includes requesting, by a processor of a first controller, access to a bus attached to a device from a processor of a second controller, wherein the bus and device are shared by the first and second controllers; waiting for a positive response from the second controller; when the positive response is received, accessing the bus for less than a first timeout period; resetting a timer before the timer reaches the first timeout period to extend access to the bus, when access is not complete and a total access time is less than a second timeout period; and releasing the bus when access is complete or the second timeout period has been reached.

In another aspect, a non-transitory, machine readable storage medium having stored thereon instructions for performing a method is provided. The machine executable code which when executed by at least one machine, causes the machine to: request, by a processor of a first controller, access to a bus attached to a device from a processor of a second controller, wherein the bus and device are shared by the first and second controllers; wait for a positive response from the second controller; when the positive response is received, access the bus for less than a first timeout period; reset a timer before the timer reaches the first timeout period to extend access to the bus, when access is not complete and a total access time is less than a second timeout period; and release the bus when access is complete or the second timeout period has been reached.

In yet another aspect, a system having a memory containing machine readable medium comprising machine executable code having stored thereon instructions is provided. A processor module is coupled to the memory and is associated with the first controller. The processor module is configured to execute the machine executable code to operate a first controller to: request access to a bus attached to a device from a processor of a second controller, wherein the bus and device are shared by the first and second controllers; wait for a positive response from the second controller; when the positive response is received, access the device on the bus for less than a first timeout period; reset a timer before the timer reaches the first timeout period to extend access to the bus, when access is not complete and a total access time is less than a second timeout period; and release the bus when access is complete or the second timeout period has been reached.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers.

Also, these components can execute from various non-transitory computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Methods and systems for improved processor communication are provided. While the following disclosure primarily discusses such communication in the context of baseboard management controllers (BMCs), it will be understood that other processor communications and interactions may also benefit from the teachings disclosed herein.

Figure 1:
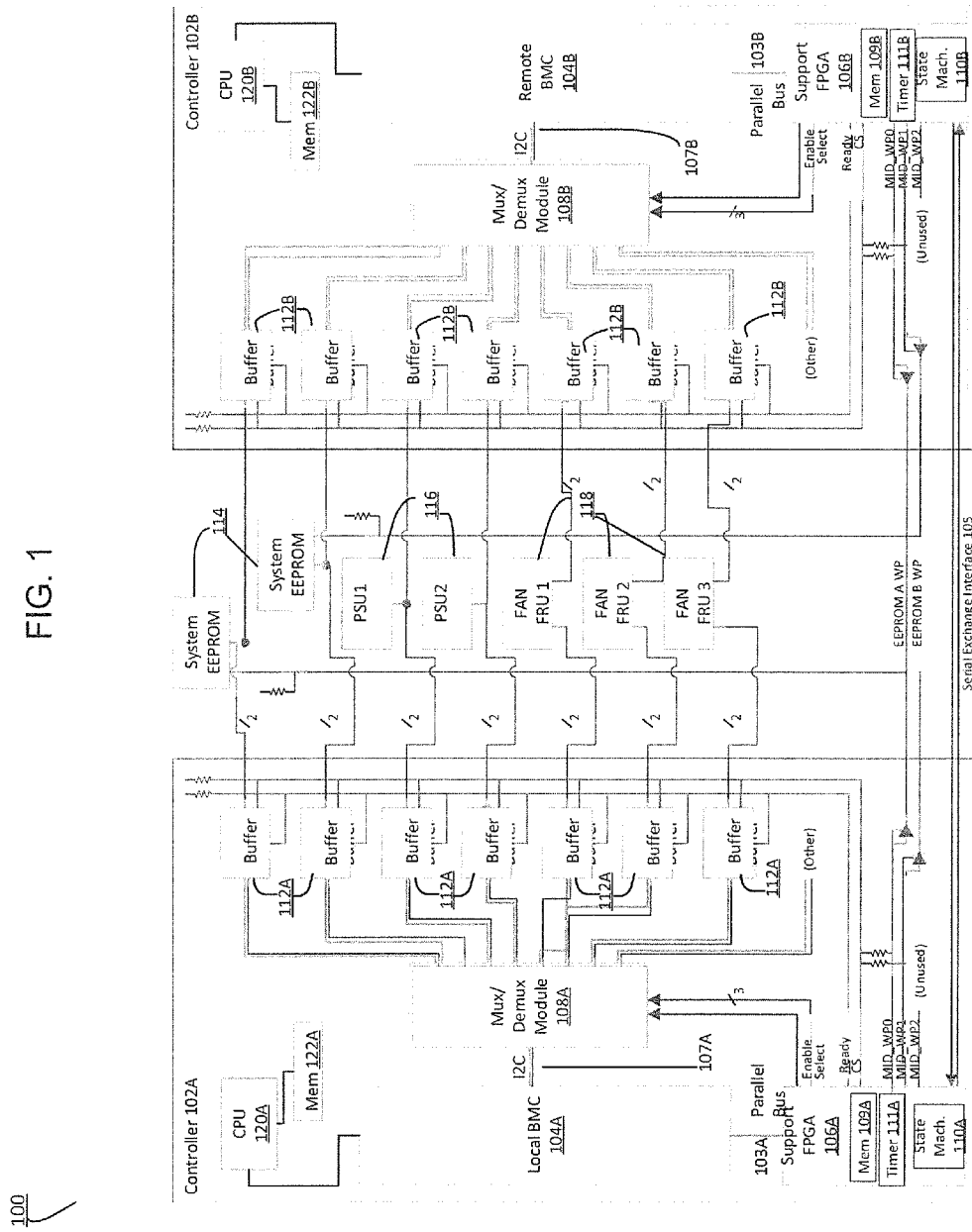
FIG. 1 provides a block diagram of system used according to an aspect of the present disclosure.

System 100:

FIG. 1 illustrates a portion of a computer system 100 comprising two controllers 102A and 102B, each having a BMC 104A and 104B respectively. BMCs 104A and 104B access several devices on a mid-plane accessible via a bus interface, for example, a serial integrated circuit (I2C) bus interface 107A/107B. Specifically, example devices illustrated in FIG. 1 include electronically erasable programmable read only memories (EEPROMs) 114, power supply units (PSUs) 116, and fan field replaceable units (FRUs) 118.

Before getting into more detail, it is noteworthy that each controller 102A and 102B may operate in the same manner. In an aspect, depending on the perspective, each can be considered a local controller or a remote controller, where the local controller is the one performing an action and the remote controller is the one to which the action is communicated and/or from which a response is obtained. While either controller will act similarly, for purposes of this discussion, controller 102A is referred to as the local controller, and controller 102B is referred to as the remote controller. As can be seen from FIG. 1, each controller will generally comprise the same components, so this discussion may only refer to one controller or one component by number, but the teachings are equally applicable, unless specifically called out to the contrary.

With that in mind, in one aspect, controller 102A includes the BMC 104A, a multiplexer/demultiplexer (Mux/Demux, also known as a data selector) module 108A, buffers 112, a support field programmable gate array (Support FPGA or SFPGA) 106A which includes a state machine 110A, a central processing unit (CPU) 120A, and memory 122A. In one aspect, BMC 104A is connected to various mid-plane devices (EEPROMs 114, PSUs 116, and Fan FRUs 118, for example) by the I2C bus 107A through the mux/demux module 108A which is used, in combination with buffers 112, to read information from the mid-plane device 114, 116, and 118.

In one aspect, CPU 120A may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

In one aspect, memory 122A comprises volatile and/or non-volatile memory, such as Random Access Memory (RAM), Read only Memory (ROM), flash memory, an EEPROM, or the like. In one aspect, CPU 120A carries out processes and executes firmware that may be stored in memory 122A. For example, in one aspect, memory 122A may store firmware executed by CPU 122A to communicate with and/or control the BMC 104A.

BMC 104A accesses devices 114, 116, and 118 via Support FPGA 106A and the data selector module 108A through bus 107A. Data from the mid-plane devices is electrically isolated by buffers 112A and read by BMC 104A via the data selector module 108A. In an aspect, the BMC 104A controls buffers 112A to select the device with which it will communicate. In an aspect one BMC 104A may access one device (for example an EEPROM 114) while the other BMC 104B accesses another device (for example a FAN FRU 118), but both BMCs cannot access the same device simultaneously without potentially causing problems.

The local Support FPGA 106A communicates with the remote controller 102B's remote Support FPGA 106B through a serial exchange interface (or bus) 105 to implement arbitration logic to prevent simultaneous access tries to the same device 114, 116, 118. This arbitration logic that may be executed by state machines 110A/110B is described in more detail below.

State machine 110A has access to memory 109A which stores first and second timeout periods that are used to control device access. State machine 110A maintains various states for controlling device access that are described below in detail with respect to FIG. 3. In an aspect, Support FPGAs 106A, 106B include connections (either included with serial exchange interface 105 or separate therefrom) that will change values indicating whether a remote Support FPGA is present. These indicators may allow shortcuts or changes to bus access processes when a remote controller 102B and its Support FPGA 106N have been removed or have failed, for example.

Figure 2A:
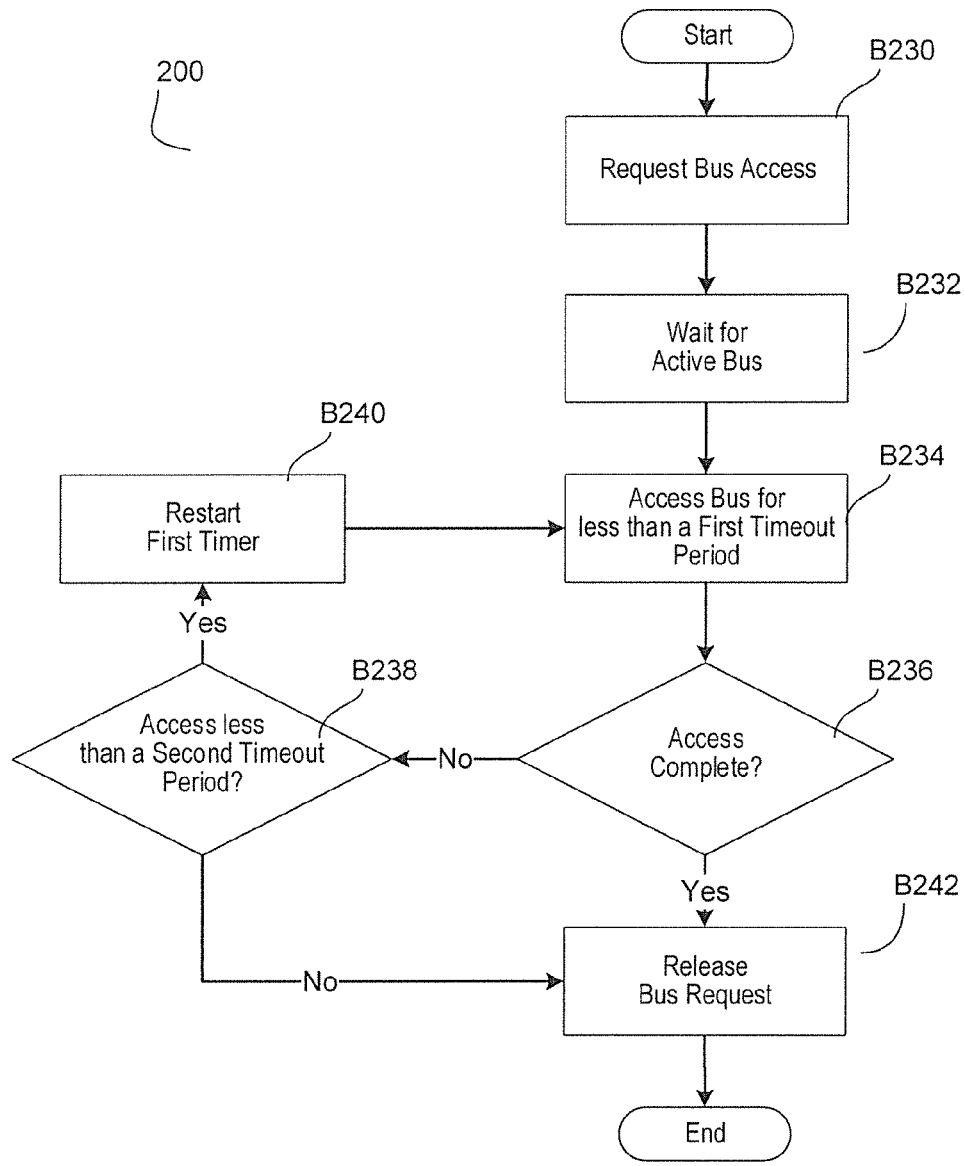
FIGS. 2A and 2B illustrate example process flows for a controller interacting with a device shared with another controller, according to one aspect of the present disclosure.

Process Flows:

Turning to FIG. 2A, process 200 illustrates an example of device access by BMC 104A, 104B, according to an aspect. The process starts with two controllers 102A, 102B configured and running with their BMCs having access to common devices, for example on a mid-plane and accessible through a bus 107A, 107B (and data selector modules 108A, 108B and appropriate buffers 112A, 112B), for example an inter-integrated circuit (I2C) bus. Other bus and device configurations are also possible according to other aspects.

At block B230, the local BMC 104A requests access to a bus N, where access to bus N equates to access of one of the mid-plane devices, such as EEPROM 114, PSU 116, or fan FRU 118 through bus N. In an aspect, this request is initiated by local BMC 104A and passed to local Support FPGA 106A via a parallel bus 103A. Local Support FPGA 106A sends a message via interface 105 to the remote Support FPGA 106B requesting access.

At block B232, via serial interface 105 the local BMC 104A waits to receive access from the local and remote Support FPGAs 106A, 106B communications. When the local Support FPGA reports that the BMC 104A can access bus N as an active bus, the process continues to block B234, where the local BMC 104A can access the bus and communicate with the chosen mid-plane device (for example, Fan FRU 1 118) for a time less than a first timeout period. In an aspect, this first timeout period may be, for example, between about 1 and 256 milliseconds. This first timeout period may be stored in memory 109A according to an aspect. Additionally, state machine 110A may limit initial access for the bus N to this first timeout period, in an aspect. Further, at block 234, a timer 111A (located at local SFPGA 106A in an aspect) may be started.

As the timer 111A runs, the local BMC 104A may determine whether access will be complete within the first timeout period at block B236. If not, the local BMC 104A checks to see if the total access time is less than a second timeout period at block B238; this total access time may also be maintained by timer 111A. In an aspect, the second timeout period may be, for example, between about 1 and 16 seconds, or greater than the first timeout period. If the local BMC's access time is less than the second timeout period, the local BMC is allowed to restart the first timer at block B240 and continue accessing the bus N back at block B234.

On the other hand, if the local BMC 104A has completed access (block B236) or has reached the second timeout period (block B238), the local BMC relinquishes control of the bus N and device 114, 116, 118 at block B242. Having the second timeout period helps to prevent the remote controller 102B from being starved from access to the bus N and associated device. In one aspect, the second timeout period cannot be reset by local controller 102A or its BMC 104A. Generally the second timeout period is reset after control of the bus is relinquished, such as for example, when a new request for access to the given bus N is generated.

In an aspect, if the BMC 104A does not relinquish its control, the Support FPGA 106A and its state machine 110A may force it out and set an error condition for the particular bus/device. Further, in an aspect, the state machine 110A may not allow the BMC 104A to access the same device again unless it acknowledges the error and resets the error condition. If local BMC 104A requires more time with a mid-plane device, it restarts the process and negotiates with the remote controller 102B for an additional access time.

Figure 2B:
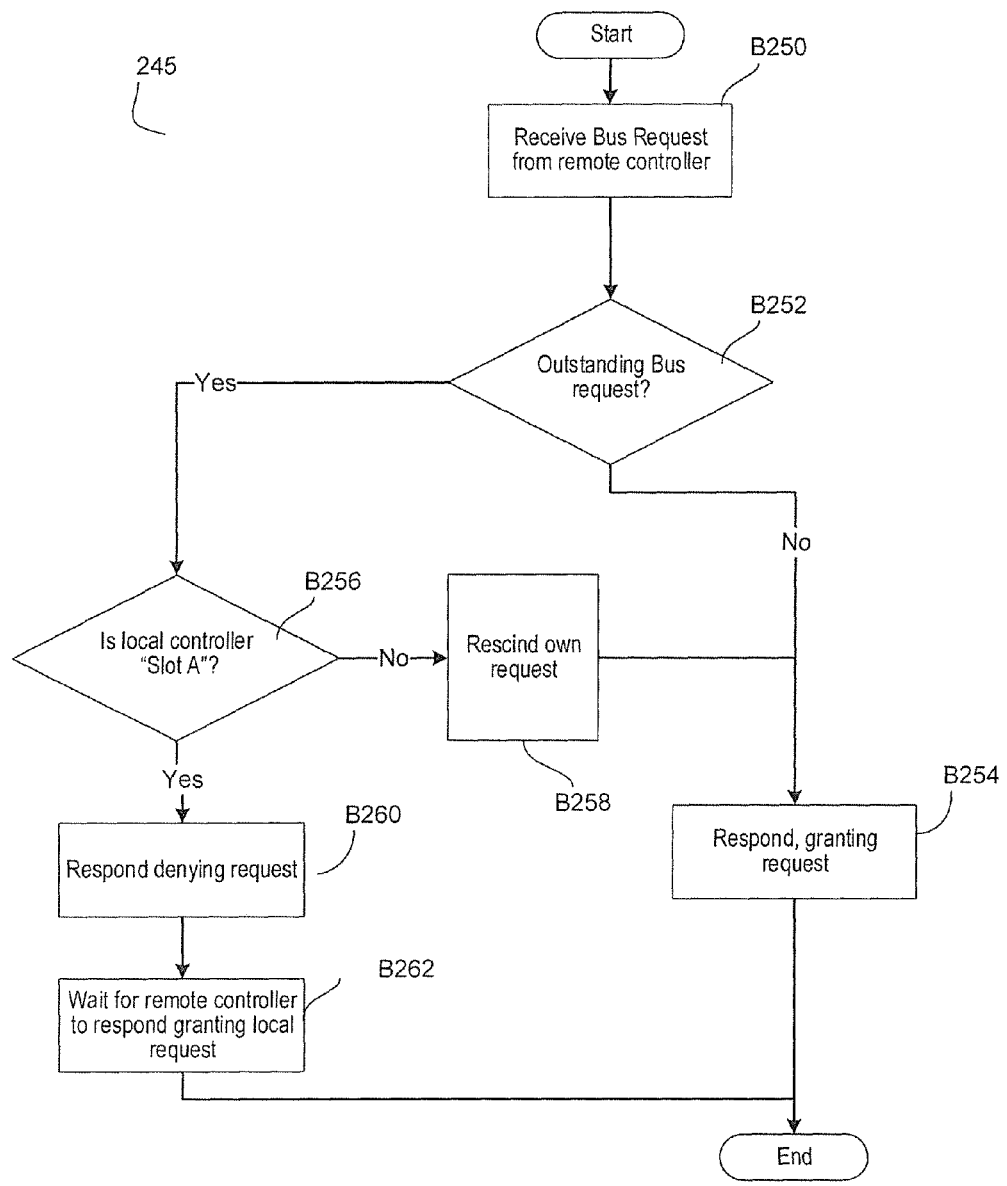

FIG. 2B illustrates a process flow 245 for processing a request to access bus N, according to one aspect. The process begins with the local and remote controllers 102A, 102B configured and operational. The state machine 110B of remote controller 106B is in an inactive state or a wait state for the bus N (described below with respect to FIG. 3). At block B250, the local controller 102A receives a request to access the bus N and its associated mid-plane device (114, 116, or 118) from a remote controller 102B. In an aspect, the request is received by the local Support FPGA 106A over a serial communications bus 105 (from the remote Support FPGA 106B).

At block B252, the local Support FPGA 106A determines if it (or its associated local BMC 104A) has an outstanding request to access the same bus N. If the local Support FPGA 106A (or BMC 104A) does not have a similar request outstanding for bus N, then the process proceeds to block B254, and the local Support FPGA 106A responds granting the request to the remote Support FPGA 106B. State machine 110A is aware of this state, so that local Support FPGA 106A does not allow the local BMC 104A to make its own request for the bus until the state changes to indicate that bus N is free.

If the local BMC 104A does have an outstanding request for the same bus, then there may be a conflict, likely that both local and remote BMCs 104A, 104B have made a simultaneous or nearly simultaneous request for the same bus. In this case, the controller resolves the conflict by proceeding to block B256.

At block B256, the local Support FPGA 106A determines whether the local controller 102A (or the BMC 102A, in another aspect) is at a particular slot, for example a "Slot A" controller. In an aspect, one slot is given primary control or priority over the other (referred to as Slot A) while the other slot receives secondary control (referred to as Slot B). This priority may be a static state, one that can be pre-configured by an administrator, or dynamically configured based on certain conditions, for example.

If the local controller does not have priority, the process continues to block B258, where the local BMC 104A rescinds its own request. In an aspect, this block may be omitted with the local BMC's request simply being denied by the remote Support FPGA 106B, for example. The process continues to block B254, where the request is granted, as described above.

If the local BMC 104A does have priority, then the process proceeds to block B260, where the local Support FPGA 106A responds to remote Support FPGA 106B (which forwards it to the remote BMC 104B) denying the request. The local BMC 104A also waits for the remote controller 102B to respond to its own request for access to bus N. In an aspect, there may also be an override feature that may allow the local BMC 104A to simply take control of the bus rather than wait for a response from the remote BMC 104B. In an aspect, the override may only be available to the BMC that has priority. In still another aspect, when the local BMC 104A does not have priority of access, it may simply wait rather than rescind its own request (at block B258); in such a case, it may periodically loop back to B252 (path not shown) to recheck on the bus N availability. Its request may be granted once the remote Support FPGA 106B has released the bus.

Figure 3:
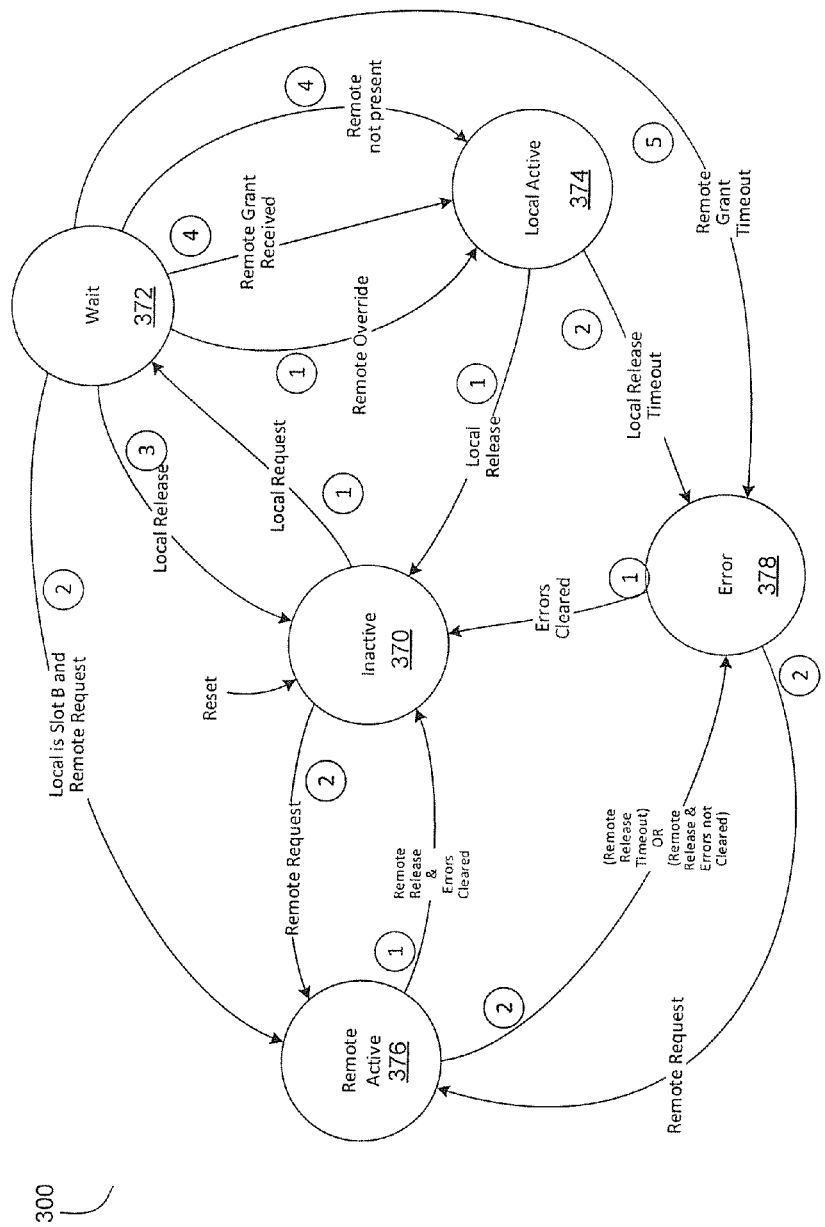
FIG. 3 is an example state diagram according to one aspect of the disclosure.

For effective communication between the local Support FPGA 106A and remote Support FPGA 106B, as mentioned above, Support FPGA 106A maintains state machine 110A and remote Support FPGA 106B maintains state machine 110B. As set forth above, the state machine 110A holds indications of the states of each bus (or portion thereof) that can access a mid-plane device 114, 116, 118. FIG. 3 illustrates a state diagram 300 in accordance with the methods and systems described herein. This state diagram illustrates the various states for bus access and how the Support FPGA 106A can update the states based on different actions. In an aspect, state machine 110A tracks the states for each bus used to access a mid-plane device.

In one aspect as illustrated, each bus N is in an inactive state 370, a wait state 372, a local active state 374, a remote active state 376, or an error state 378. FIG. 3 illustrates numerous paths between these states that indicates conditions that can cause the state to change and how. The circled numbers indicate the relative priority for each path, with 1 being the highest priority.

Generally, a given bus's state is in an inactive state 370 during normal operation without the local or remote BMCs 104A, 104B attempting to access the given bus. As shown for example, when the local BMC 104A is reset, the local Support FPGA 106A or the state machine 110A sets the bus state indication to the inactive state 370. When the local BMC 104A wishes to access the given bus, it makes a request through the Support FPGA 106A (as described above) and the Support FPGA changes the state to a wait state 372. Under normal operation, the remote Support FPGA 106B grants the access request and the local Support FPGA 106A changes the state to the local active state 374. The local Support FPGA 106A can also change the state to the local active state 374 based on a remote override or when the remote controller 106B is not present or responsive.

On the other hand, if the local BMC 104A cancels the request, the local Support FPGA 106A or its state machine 110A releases the request and return the bus to inactive state 370. When the local Support FPGA 106A both sends a bus access request and receives one for the same bus simultaneously, the local and remote controllers 106A, 106B resolve the conflict. If the local BMC 104A is "Slot B" and there is also a remote request from remote BMC 104B, then the local Support FPGA 106A cedes control to the remote BMC 104B (by sending a message through remote Support FPGA 106B) and changes state from the wait state 372 to the remote active state 376, indicating that remote BMC 104B is accessing the mid-plane device on the given bus. In that case, the local BMC 104A may indicate that access was denied in an aspect or queue the request to try again later.

If the local BMC 104A is "Slot A" and there is also a remote request from remote BMC 104B, then the remote Support FPGA 106B cedes control to the local BMC 104A, and the local BMC 104A receives a remote grant through local Support FPGA 106A. Finally, in an aspect, if the remote Support FPGA 106B times out on a grant request, the local Support FPGA 106A changes the state from the wait state 372 to error state 378.

When in the local active state, Support FPGA 106A indicates to BMC 104A that it can access the given bus, which it can do according to the process of FIG. 2, for example. From the local active state 374, the BMC 104A can complete its task and release the bus, in which case the Local Support FPGA 106A changes the local state machine 110A state back to inactive state 370. The local Support FPGA also changes the state to the inactive state 370 if the second timeout period has been surpassed. If there is a problem releasing the bus and that task times out, then the local Support FPGA 374 changes the state to the error state 378.

When the local state machine 110A indicates that a given bus is in remote active state 376, the remote BMC 104B is able to access the bus and its mid-plane device. Local BMC 104A requests to access the same bus is denied or queued for later in an aspect.

When the remote Support FPGA 106B indicates that it is releasing the bus, the local Support FPGA 106A changes the state to the inactive state 370, if there are no errors. If there is a remote release timeout or errors that are not cleared, the local Support FPGA changes the state of the bus to the error state 378. For example, when a Support FPGA 106A grants a remote request for access, it may start its own timer 111A to track the remote BMC's access time. When it reaches the second timeout period, if it has not received a release from the remote Support FPGA 106B, it may change the state to the error state 378 to indicate that the remote BMC 104B should no longer be accessing the bus.

From the error state 378, the local Support FPGA 106A can return the bus to the inactive state 370 when errors are cleared or it can change the state to remote active state 376 if it receives a remote request first.

Figure 4:
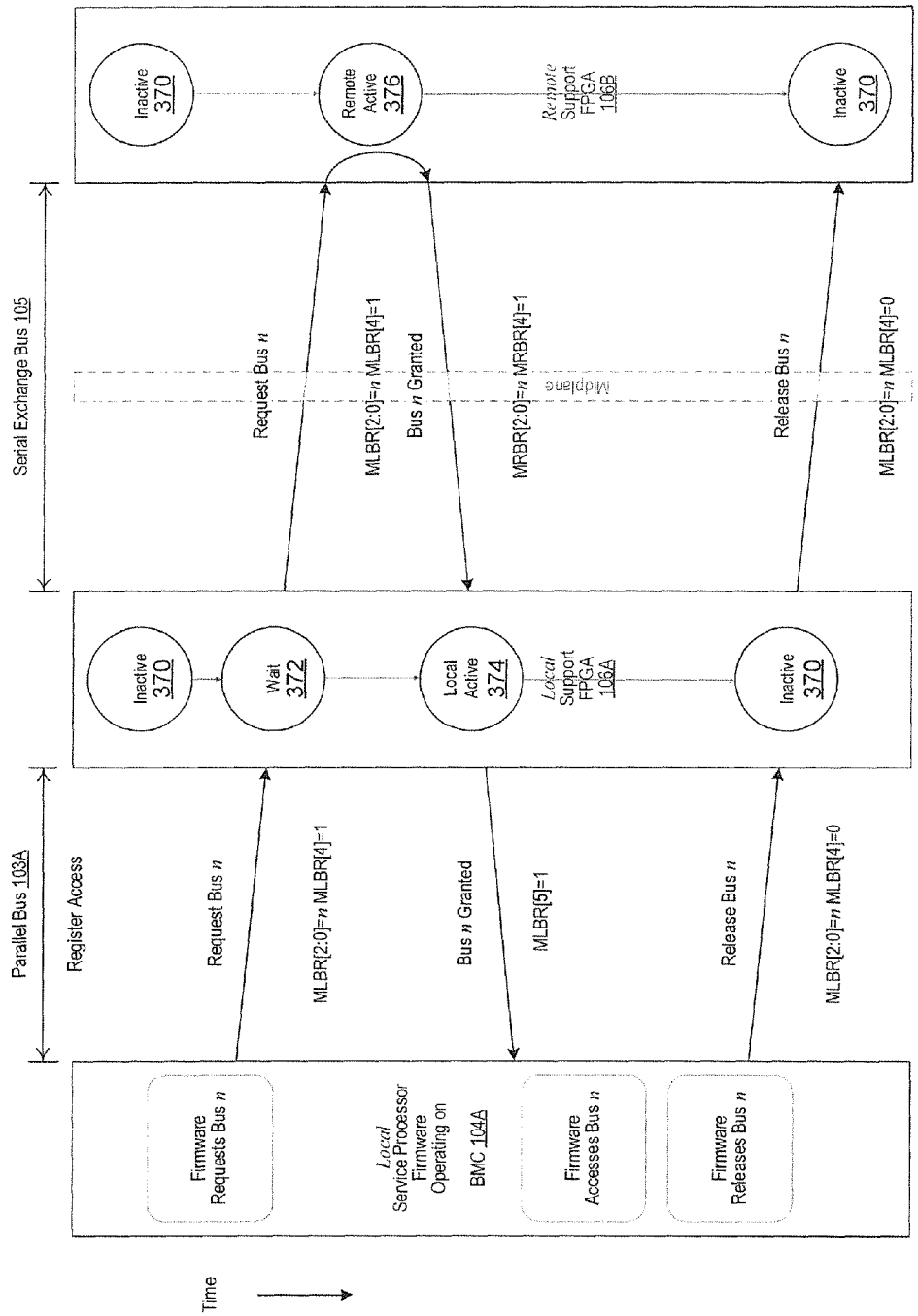
FIG. 4 is an example process flow illustrating a negotiation between controllers for bus access, according to one aspect of the present disclosure.

FIG. 4 illustrates the processes of FIGS. 2A and 2B generally with breakouts for both the local and remote controller components and their states as described with respect to FIG. 3. Generally, the process starts at the top and proceeds downward over time. The process starts with firmware on the local BMC 104A requesting Bus N. At this point, the states for both the local and remote Support FPGAs 106A, 106B (and their respective state machines 110A, 110B) indicate an Inactive State 370. The bus N access request is passed from the BMC 104A across a parallel bus 103A to local Support FPGA 106A. The local Support FPGA 106A updates the state machine 110A to indicate the wait state 372, then passes the request over the serial bus 105 to the remote Support FPGA 106B of the remote controller 102B.

The remote Support FPGA 106B updates its state machine 110B to indicate that bus N is in the remote active state 376 (because the requesting "local" BMC 104A is actually "remote" to BMC 104B). The remote BMC 104B, through its remote Support FPGA 106B, sends a message granting the access request for bus N over the serial bus 105.

The local support FPGA 106A receives the grant and updates the state machine 110A once again to the local active state 374. It communicates this grant to the firmware over the parallel bus 103A. At this point, the firmware of local BMC 104A can access bus N and retrieve information from, pass information to, or otherwise interact with the mid-plane device on bus N. When it is done (or times out), the firmware of local BMC 104A releases bus N, passing this information across the parallel bus 103A to the local support FPGA 106A. The appropriate state machine 110A entry is updated again to return the state to inactive state 370. It also passes the release across the serial bus 105 to the remote Support FPGA 106B of remote controller 102B, which updates its appropriate state machine 110B entry to also return to the inactive state 370.

Thus, methods and systems for preventing simultaneous access to the same device by multiple controllers have been described. Note that references throughout this specification to "an aspect" or "one aspect" mean that a particular feature, structure or characteristic described in connection with the aspect is included in at least one embodiment of the present disclosure. Therefore, it is emphasized and should be appreciated that two or more references to "one aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art. It is also important to note that the process flow diagrams and discussion are only examples and different process steps may be rearranged, combined, or split into multiple processes in different aspects without detracting from the spirit of the teachings herein. This similarly applies to components and modules described herein, which are particular examples of ideas that can be implemented with more or fewer components and/or the components described controlling different aspects of the processes and teachings herein.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
   requesting, by a first processor of a first computing device, access to a bus attached to a device, wherein the bus and device are shared by the first computing device and a second computing device;
   waiting, by the first processor of the first computing device, for a positive response from the second computing device for the requested access to the bus;
   accessing, by the first processor of the first computing device, the bus for less than a first timeout period when the positive response is received;
   resetting, by the first processor of the first computing device, a timer before the timer reaches the first timeout period to extend access to the bus, when access is not complete and a total access time is less than a second timeout period, wherein the first timeout period is different from the second timeout period; and releasing, by the first processor of the first computing device, the bus when access is complete or the second timeout period has been reached.

2. The method of claim 1, wherein the bus is an inter-integrated circuit (I2C) bus.

3. The method of claim 1, further comprising:
tracking, by the first processor of the first computing device, an indication of a state of the bus, wherein the state comprises at least one of: inactive, waiting, local active, and remote active.

4. The method of claim 3, wherein requesting access to a bus occurs when the indication indicates the bus is in an inactive state.

5. The method of claim 3, further comprising:
updating, by the first processor of the first computing device, the indication of the state of the bus to represent waiting, when requesting access to a bus; and
updating, by the first processor of the first computing device, the indication of the state of the bus to represent local active when the positive response is received.

6. A non-transitory, machine readable storage medium having stored thereon instructions for performing a method, comprising machine executable code which when executed by at least one machine, causes the machine to:
request access to a bus attached to a device, wherein the bus and device are shared by a first computing device and a second computing device;
wait for a positive response from the second computing device for the requested access to the bus;
access the bus for less than a first timeout period when the positive response is received;
reset a timer before the timer reaches the first timeout period to extend access to the bus, when access is not complete and a total access time is less than a second timeout period, wherein the first timeout period is different to the second timeout period; and
release the bus when access is complete or the second timeout period has been reached.

7. The storage medium of claim 6, wherein the bus is an I2C bus.

8. The storage medium of claim 6, further comprises track an indication of the state of the bus, wherein the state comprises at least one of: inactive, waiting, local active, and remote active.

9. The storage medium of claim 8, wherein requesting access to a bus occurs when the indication indicates the bus is in an inactive state.

10. The method of claim 8, further comprises:
update the indication of the state of the bus to represent waiting, when requesting access to a bus; and
update the indication of the state of the bus to represent local active when the positive response is received.

11. A computing device comprising:
a processor;
a memory coupled to the processor which is configured to be capable of executing programmed instructions comprising and stored in the memory to:
request access to a bus attached to a device, wherein the bus and device are shared by a first computing device and a second computing device;
wait for a positive response from the second computing device for the requested access to the bus;
access the bus for less than a first timeout period when the positive response is received;
reset a timer before the timer reaches the first timeout period to extend access to the bus, when access is not complete and a total access time is less than a second timeout period, wherein the first timeout period is different to the second timeout period; and
release the bus when access is complete or the second timeout period has been reached.

12. The device as set forth in claim 11 wherein the bus is an I2C bus.

13. The device as set forth in claim 12, wherein requesting access to a bus occurs when the indication indicates the bus is in an inactive state.

14. The device as set forth in claim 12 wherein the processor coupled to the memory is further configured to be capable of executing at least one additional programmed instruction comprising and stored in the memory to:
update the indication of the state of the bus to represent waiting, when requesting access to a bus; and
update the indication of the state of the bus to represent local active when the positive response is received.

15. The device as set forth in claim 11 wherein the processor coupled to the memory is further configured to be capable of executing at least one additional programmed instruction comprising and stored in the memory to track an indication of the state of the bus, wherein the state comprises at least one of: inactive, waiting, local active, and remote active.

* * * * *